(12) United States Patent
Birkenheuer et al.

(10) Patent No.: US 11,255,373 B2
(45) Date of Patent: Feb. 22, 2022

(54) ACTIVE THERMAL MANAGEMENT FOR FIRE-TOLERANT DRIVE SYSTEMS

(71) Applicant: Bell Helicopter Textron Inc., Forth Worth, TX (US)

(72) Inventors: Andrew Jordan Birkenheuer, Arlington, TX (US); Keith David Weaver, North Richland Hills, TX (US); Jon Damon Bennett, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 646 days.

(21) Appl. No.: 15/702,958

(22) Filed: Sep. 13, 2017

(65) Prior Publication Data

US 2018/0087561 A1 Mar. 29, 2018

Related U.S. Application Data

(60) Provisional application No. 62/399,097, filed on Sep. 23, 2016, provisional application No. 62/423,371, filed on Nov. 17, 2016.

(51) Int. Cl.
*B64C 27/14* (2006.01)
*F16C 3/16* (2006.01)
(Continued)

(52) U.S. Cl.
CPC ............... *F16C 3/16* (2013.01); *B64C 27/12* (2013.01); *B64C 27/14* (2013.01); *B64C 27/82* (2013.01);
(Continued)

(58) Field of Classification Search
CPC .... F16C 3/16; F16C 3/026; F16C 3/02; F16C 2326/06; F16C 2326/43; B64C 27/14;
(Continued)

(56) References Cited

U.S. PATENT DOCUMENTS 2,355,103 A * 8/1944 Otto ...................... B64D 45/00
 180/68.1
2,439,775 A * 4/1948 Kennedy ................... F01P 3/18
 180/68.1

(Continued)

FOREIGN PATENT DOCUMENTS

DE 2836903 2/1980
EP 2412995 A1 2/2012
(Continued)

OTHER PUBLICATIONS

European Patent Office, Communication pursuant to Article 94(3) EPC for EP Appl. No. 17192697.5 dated Jan. 16, 2020, 5 pp.
(Continued)

*Primary Examiner* — Greg Binda
(74) *Attorney, Agent, or Firm* — Daniel J. Chalker; Edwin S. Flores; Chalker Flores, LLP

(57) ABSTRACT

A thermal management system and method includes: a drive shaft; one or more fans or impellers in fluid communication with at least a portion of the drive shaft; and one or more air management baffles configured to direct air flow between the impeller and the portion of the drive shaft. In one embodiment, the system and method further includes insulation positioned about the at least a portion of the drive shaft.

15 Claims, 7 Drawing Sheets

(51) Int. Cl.
  *F16C 3/02* (2006.01)
  *B64C 27/82* (2006.01)
  *B64D 45/00* (2006.01)
  *B64C 27/12* (2006.01)
  *B64D 35/00* (2006.01)
  *F16H 57/04* (2010.01)

(52) U.S. Cl.
  CPC ............ *B64D 35/00* (2013.01); *B64D 45/00* (2013.01); *F16C 3/02* (2013.01); *F16C 3/026* (2013.01); *B64D 2045/009* (2013.01); *F16C 2326/06* (2013.01); *F16C 2326/43* (2013.01); *F16H 57/0416* (2013.01); *Y10T 464/10* (2015.01)

(58) Field of Classification Search
  CPC ......... B64C 27/82; B64C 27/12; B64D 45/00; B64D 35/00; B64D 2045/009; Y10T 464/10; F16H 57/0416
  USPC .................. 464/17; 180/68.1; 244/17.11
  See application file for complete search history.

(56) References Cited

U.S. PATENT DOCUMENTS

| | | | | |
|---|---|---|---|---|
| 2,775,104 | A | * | 12/1956 | Karcher ............ F16C 37/00 464/17 |
| 3,696,730 | A | * | 10/1972 | Masuda ............ F01P 5/06 180/68.1 |
| 7,335,108 | B2 | | 2/2008 | Lin et al. |
| 9,488,231 | B2 | * | 11/2016 | Nicholas ............ F16D 3/02 |
| 2014/0090820 | A1 | | 4/2014 | Pisani et al. |
| 2014/0217231 | A1 | | 8/2014 | Pantalone, III et al. |
| 2018/0142776 | A1 | * | 5/2018 | Alcantara Burguete ............ F16H 57/0416 |

FOREIGN PATENT DOCUMENTS

| | | |
|---|---|---|
| EP | 3056423 A1 | 8/2016 |
| EP | 3299285 A1 | 3/2018 |
| WO | 2015/047496 A2 | 4/2015 |

OTHER PUBLICATIONS

European Patent Office, European Search Report for EP Appl. No. 17192697.5 dated Feb. 5, 2018, 4 pp.
European Patent Office, Communication pursuant to Article 94(3) EPC for EP Appl. No. 17192697.5 dated Feb. 22, 2018, 9 pp.
European Patent Office, Communication pursuant to Article 94(3) EPC for EP Appl. No. 17192697.5 dated Aug. 24, 2018, 5 pp.
European Patent Office, Communication pursuant to Article 94(3) EPC for EP Appl. No. 17192697.5 dated Jan. 21, 2019, 5 pp.
European Patent Office, Communication pursuant to Article 94(3) EPC for EP Appl. No. 17192697.5 dated Jul. 24, 2019, 5 pp.
Bell Helicopter Textron Inc., "Bell 525 Relentless" Poster, Nov. 12, 2014.
Perry, Dominic , "Analysis: Bell 525 Relentless cutaway and Technical Description" Flight International, Nov. 14, 2014, London, https://www.flightglobal.com/news/articles/analysisbell525relentlesscutawayandtechnical405541/.
European Patent Office, Communication pursuant to Article 94(3) EPC for EP Appl. No. 17192697.5 dated Jun. 10, 2020, 4 pp.

* cited by examiner

ACTIVE THERMAL MANAGEMENT FOR FIRE-TOLERANT DRIVE SYSTEMS

CROSS-REFERENCE TO RELATED APPLICATIONS

This patent application claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

Not applicable.

TECHNICAL FIELD OF THE INVENTION

The present invention relates in general to the field of thermal management of drive systems, and more particularly, to a novel system for active thermal management for fire-tolerant drive systems for use in an aircraft.

BACKGROUND OF THE INVENTION

Without limiting the scope of the invention, its background is described in connection with thermal management of tail rotor drive systems of rotorcrafts.

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

A tail rotor drive system requires a mechanical coupling to an engine and transmission. In the event of excessive heat, for example, from a fire in an engine compartment, a drive shaft of a tail rotor drive system is vulnerable to damage. If a drive shaft is damaged in flight, the tail rotor's operation may be compromised, reducing or eliminating a pilot's ability to control the rotorcraft and placing the craft and its crew and occupants in danger.

One approach to protecting a tail rotor draft system from such excessive heat is the passive method of using high-temperature-capable metallic drive shafts. In the event of excessive heat in the engine compartment, the system would be protected from damage by the heat- and fire-tolerant material of the shafts. Such protection ensures safe flight and gives a rotorcraft's operator more time to land the craft safely. To further increase aircraft safety, an improved system and method for active thermal management for fire-tolerant drive systems is desirable.

SUMMARY OF THE INVENTION

In one embodiment, the present invention includes a thermal management system, including a drive shaft; one or more fans or impellers in fluid communication with at least a portion of the drive shaft; and one or more air management baffles configured to direct air flow between the impeller and the at least a portion of the drive shaft. In one aspect, the portion in fluid communication with the one or more fans or impellers is at least one of a proximate portion, a distal portion, or an intermediate portion of the drive shaft. In another aspect, the one or more fans or impellers are connected to the drive shaft, or are powered independently of the drive shaft. In another aspect, the drive shaft is a tail rotor drive shaft, a main rotor shaft, a proprotor shaft, a propeller shaft, or a wind-turbine shaft. In another aspect, the system further includes the one or more air management baffles that surround at least a portion of the drive shaft. In some aspects, the one or more air management baffles include a rigid material, a flexible material, or combinations thereof. In another aspect, at least a portion of the draft shaft includes a composite material. In some aspects, the system further includes insulation positioned about at least a portion of the drive shaft. In another aspect, the system further includes the insulation surrounds the portion of the drive shaft adjacent an engine compartment. In another aspect, the insulation surrounds at least a portion of the one or more air management baffles.

In another embodiment, the present invention includes a method of managing the thermal condition of a drive system, including placing one or more fans or impellers in fluid communication with a portion of a drive shaft; and configuring one or more air management baffles to direct air between the one or more fans or impellers and the drive shaft. In one aspect, the method further includes placing the one or more fans or impellers in fluid communication with at least one of a proximate portion, a distal portion, or an intermediate portion of the drive shaft. In another aspect, the method further includes connecting the one or more fans or impellers to the drive shaft. In another aspect, the method further includes powering the one or more fans or impellers independently from the drive shaft. In another aspect, the drive shaft is a tail rotor drive shaft, a main rotor drive shaft, a proprotor drive shaft, a propeller drive shaft, or a wind-turbine drive shaft. In another aspect, the method further includes configuring one or more air management baffles to surround at least a portion of the drive shaft. In another aspect, the one or more air management baffles include a rigid material, a flexible material, or combinations thereof. In another aspect, the drive shaft, the one or more fans or impellers, or both include a composite material. In another aspect, the method further includes positioning insulation about at least a portion of the drive shaft. In another aspect, the method further includes positioning insulation about at least a portion of the drive shaft adjacent to an engine compartment.

In another embodiment, the present invention includes a rotorcraft including a fuselage; an engine compartment coupled to the fuselage; an engine coupled to the engine compartment and disposed within the engine compartment; a transmission coupled to the fuselage; the engine coupled to the transmission; a drive shaft coupled to the transmission; one or more fans or impellers in fluid communication with at least a portion of the drive shaft; and one or more air management baffles configured to direct air flow between the one or more fans or impellers and the at least a portion of the drive shaft. In one aspect, the rotorcraft further includes insulation between the tail rotor drive shaft and the engine compartment.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is directed to a thermal management system for drive shafts that include one or more fans or impellers in fluid communication with at least a portion of the drive shaft. The thermal management system may also include one or more air management baffles configured to direct air flow between the impeller and the drive shaft.

Figure 1:
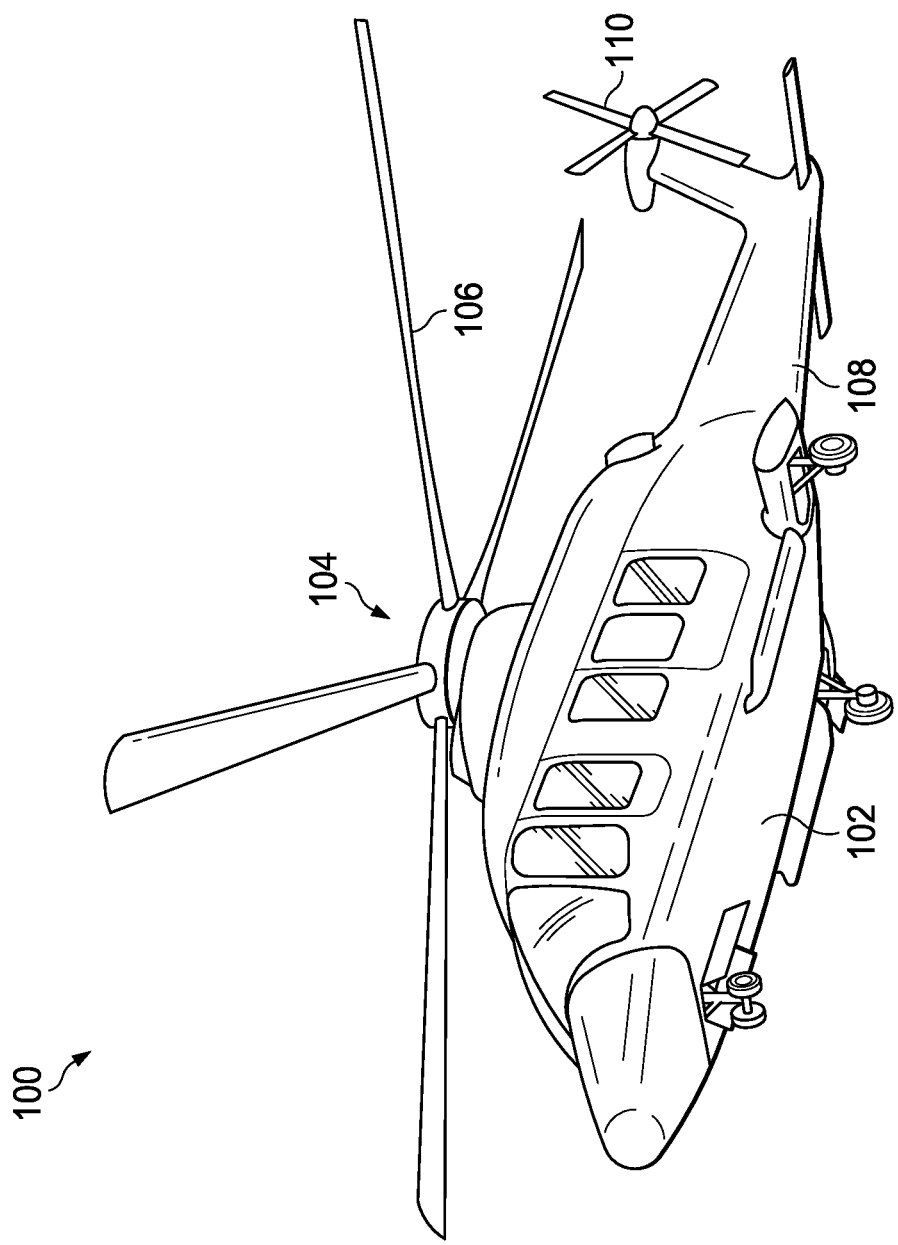
FIG. 1 shows a side view of a helicopter according to a particular embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
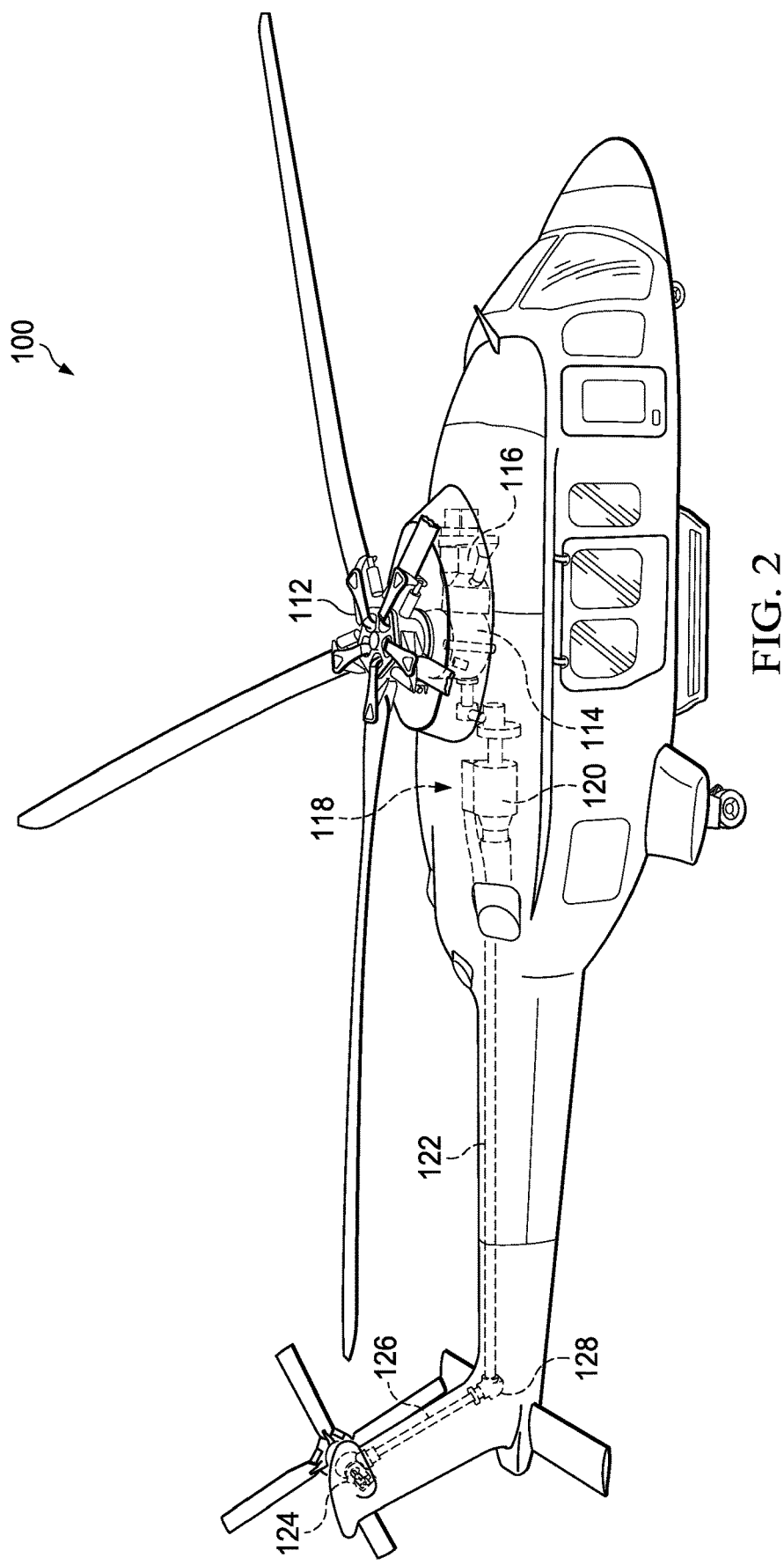
FIG. 2 shows a partial cross-section, perspective view of helicopter aircraft according to an embodiment of the present application.

For example, FIG. 2 shows a partial cross-section isometric view of aircraft 100 that includes additional detail of an embodiment of the present invention. Aircraft 100 further includes a rotor mast 112, which is connected to the main transmission 114. The main transmission 114 is connected to one or more accessory gear boxes 116. The engine compartment 118 contains engine 120, and the main transmission 114 is connected to engine 120. A tail rotor drive shaft 122 transmits mechanical rotation to the tail rotor gear box 124, which is connected via tail rotor drive shaft 126, via intermediate gear box 128.

Figure 3A:
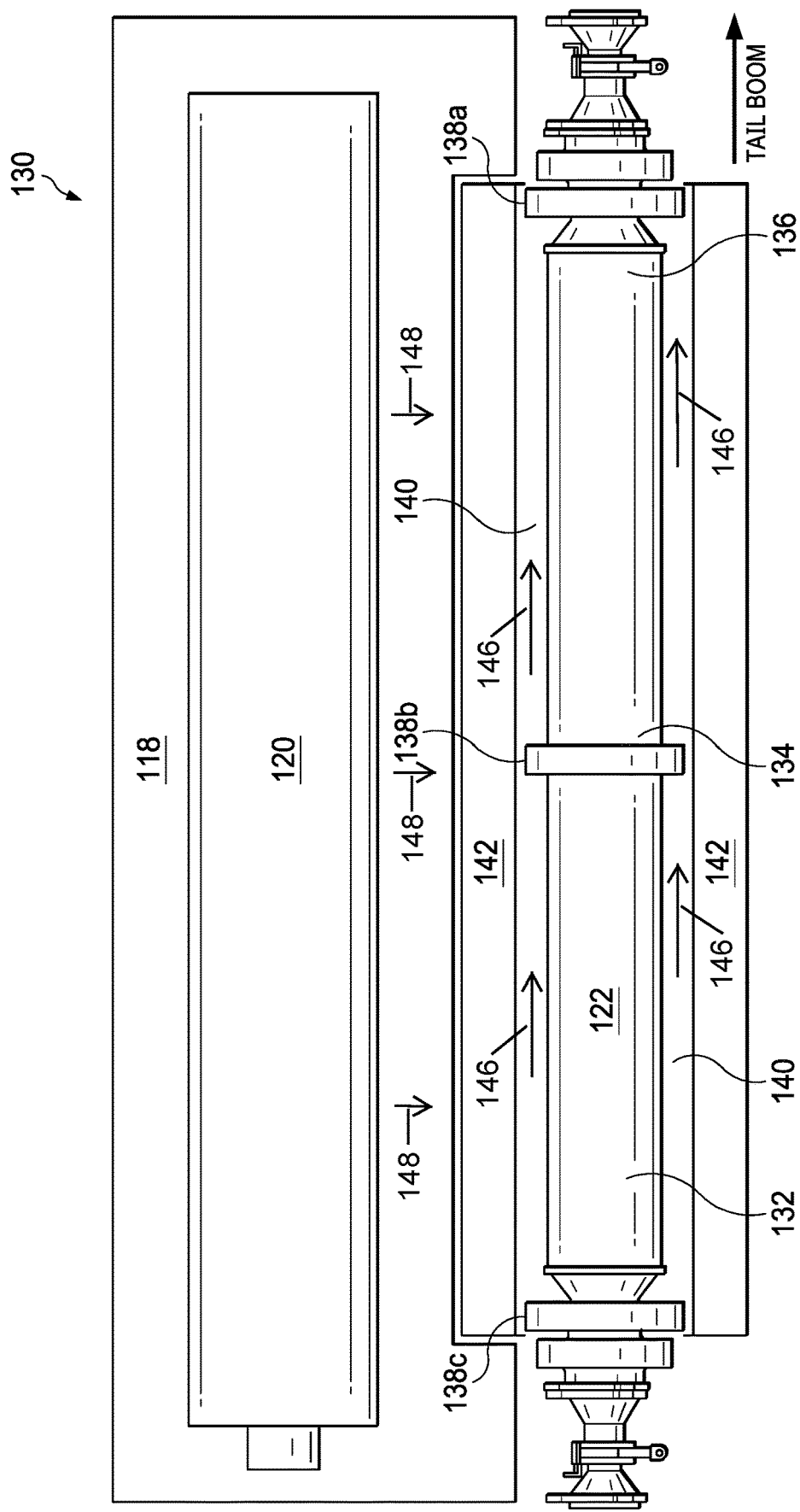
FIG. 3A shows a cross-sectional view of a portion of a drive system that depicts an embodiment of the present invention.

Referring now to FIGS. 3A, 3B, 3C and 3D, these figures show cross-sectional views of portions of an active thermal management system 130 that illustrate various embodiments of the present invention. FIG. 3A shows a side view of the length of tail rotor drive shaft 122 within a cross-sectional view of a portion of the active thermal management system 130. The tail rotor drive shaft 122 may be composed of a metal or composite material that is resistant to heat. Tail rotor drive shaft 122 can be a single shaft or can be made from various connected shafts. In this illustration, the tail rotor drive shaft 122 has, in relation to the front of the aircraft, proximate portion 132; a portion distant from the front of the aircraft, distal portion 136; and one or more intermediate portions 134 between proximate portion 132 and distal portion 136, an engine compartment 118 and an engine 120. One or more fans or impellers 138a, 138b, 138c are placed in fluid communication with tail rotor drive shaft 122. One or more fans or impellers 138a, 138b, 138c may be connected to the proximate portion 132, the intermediate portion 134, the distal portion 136, or any combination thereof, of tail rotor drive shaft 122 so that the fans or impellers 138a, 138b, 138c rotate when the tail rotor drive shaft 122 rotates, causing air 146 to flow across the surface of tail rotor drive shaft 122. The fans or impellers 138a, 138b, 138c may be directly connected to the tail rotor drive shaft 122 or powered independently of the tail rotor drive shaft 122. The fans or impellers 138a, 138b, 138c are shown fixed to a variety of locations on or about tail rotor drive shaft 122 to illustrate a number of possible location(s) for the fans or impellers 138a, 138b, 138c. One or more air management baffles 140 may also be included and configured to direct air 146 moved to, or from, the one or more fans or impellers 138a, 138b, 138c, over the tail rotor drive shaft 122 to cool it. Insulation 142 may also be included and is positioned to protect the tail rotor drive shaft 122 from heat 148 or fire in the engine compartment 118, which insulation 142 may also be cylindrical and surround the entire tail rotor drive shaft 122. Insulation 142 may be positioned near the tail rotor drive shaft 122, the air management baffle 140, or both between the engine compartment 118 and the tail rotor drive shaft 122. Insulation 142 will generally be positioned to surround tail rotor drive shaft 122 or air management baffle 140 or both, and may be rigid, flexible or combinations thereof.

Figure 3B:
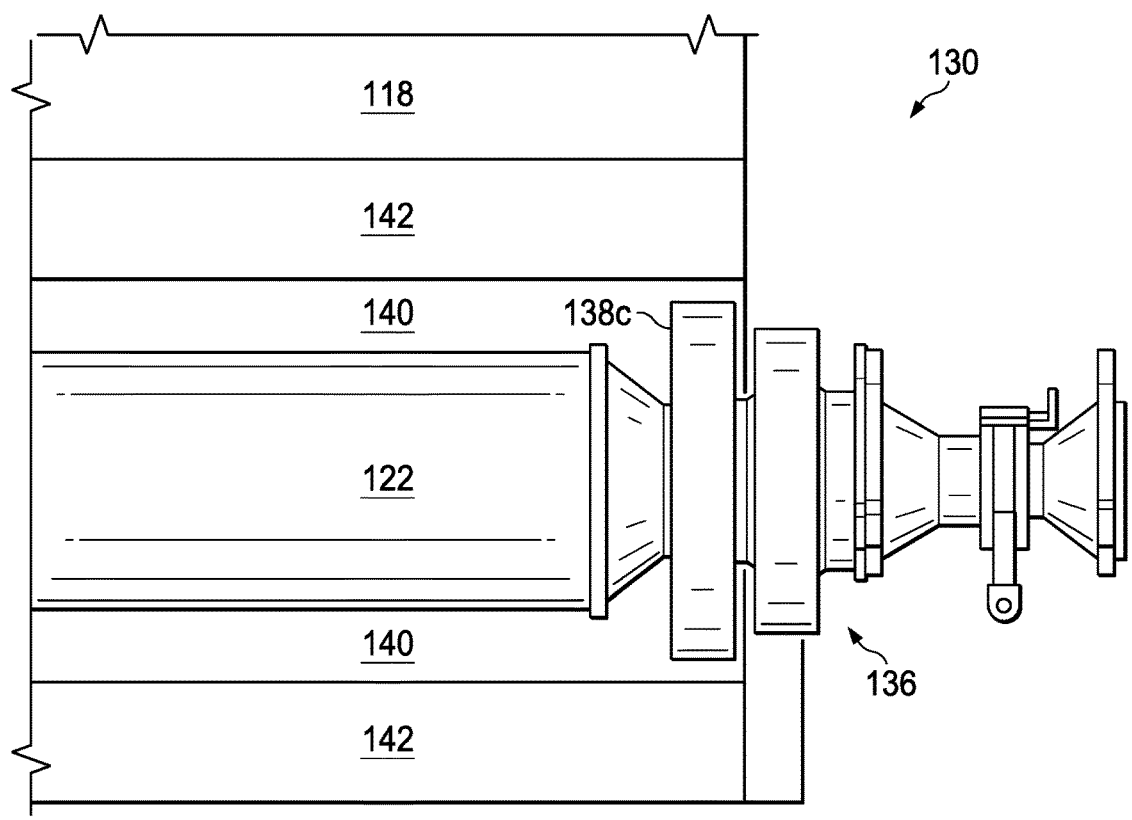
FIG. 3B shows a cross-sectional view of a portion of a drive system that depicts an embodiment of the present invention.

FIG. 3B shows a side view of the distal portion 136 of tail rotor drive shaft 122 with fan or impeller 138*c* within a cross-sectional view of a portion of the active thermal management system 130. In this embodiment, fan or impeller 138*c* is within the air management baffle 140 compartment of distal portion 136, with air management baffle 140 surrounding distal portion 136, and within insulation 142 positioned at distal portion 136 as described in FIG. 3A. A similar configuration may be used at the proximal end of the tail rotor drive shaft 122.

Figure 3C:
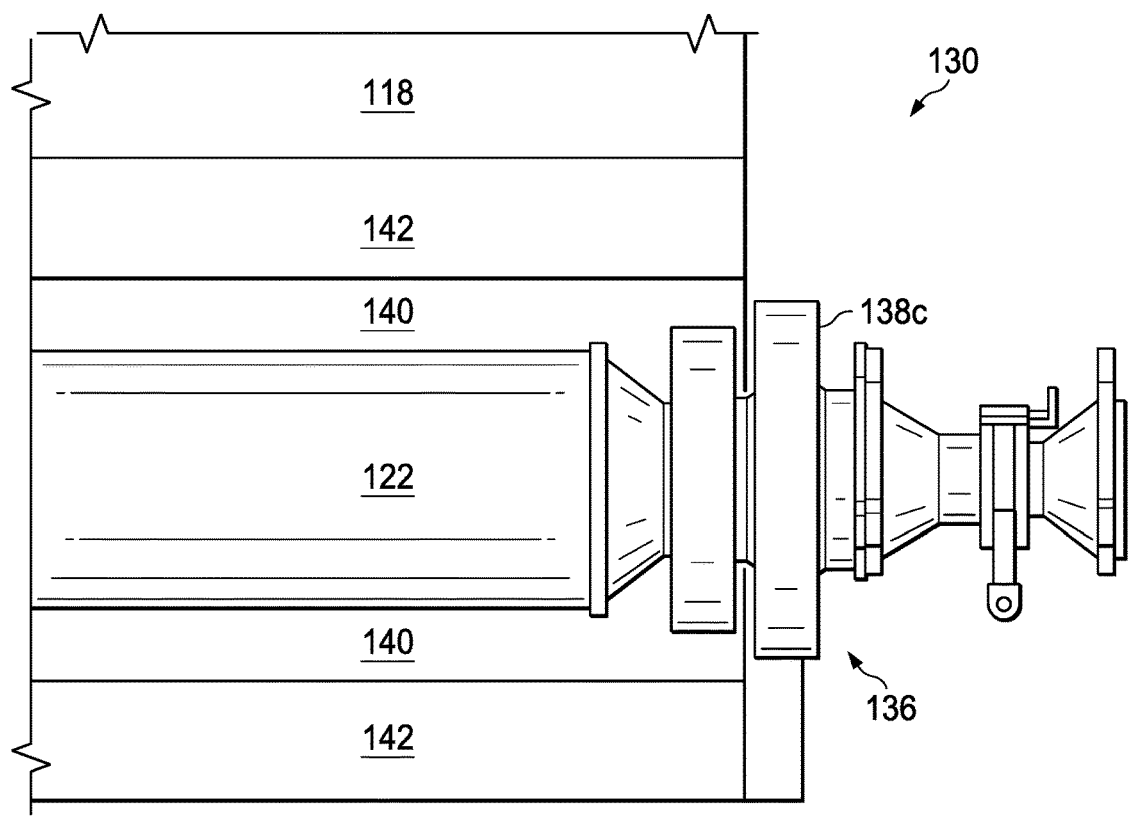
FIG. 3C shows a cross-sectional view of a portion of a drive system that depicts an embodiment of the present invention.
Figure 3D:
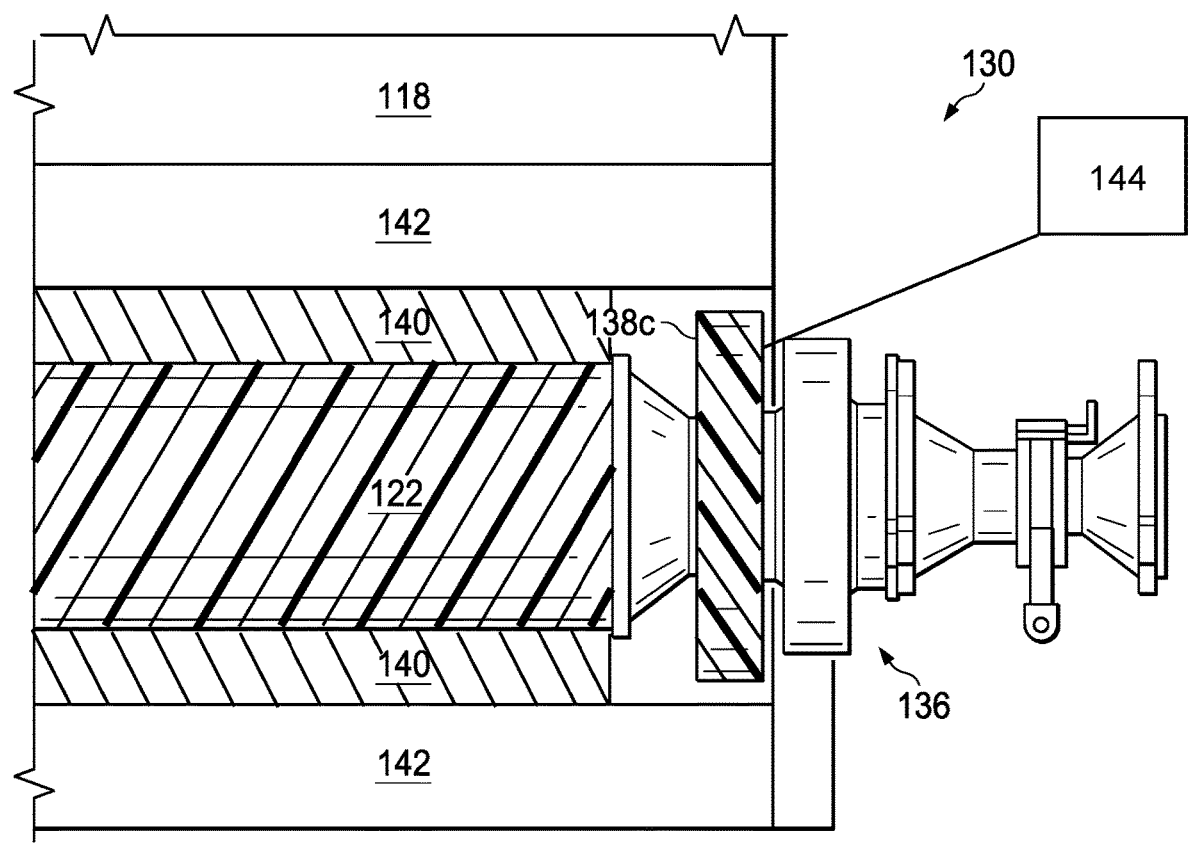
FIG. 3D shows a side view of a portion of a drive system that depicts an embodiment of the present invention.

FIGS. 3C and 3D show a side view of the distal portion 136 of tail rotor drive shaft 122 within a cross-sectional view of a portion of the active thermal management system 130 and with fan or impeller 138*c* fixed outside the distal portion 136 and the air management baffle 140 compartment. Insulation 142 is positioned near distal portion 136 as described in FIG. 3A. A similar configuration may be used at the proximal end of the tail rotor drive shaft 122. As shown in FIG. 3D, the drive shaft 122 may comprise a composite material, and the one or more air management baffles 140 may include a rigid material, a flexible material, or combinations thereof. In addition, the fan or impeller 138*c* may be driven independently of the drive shaft 138*c* using power source 144.

Figure 4:
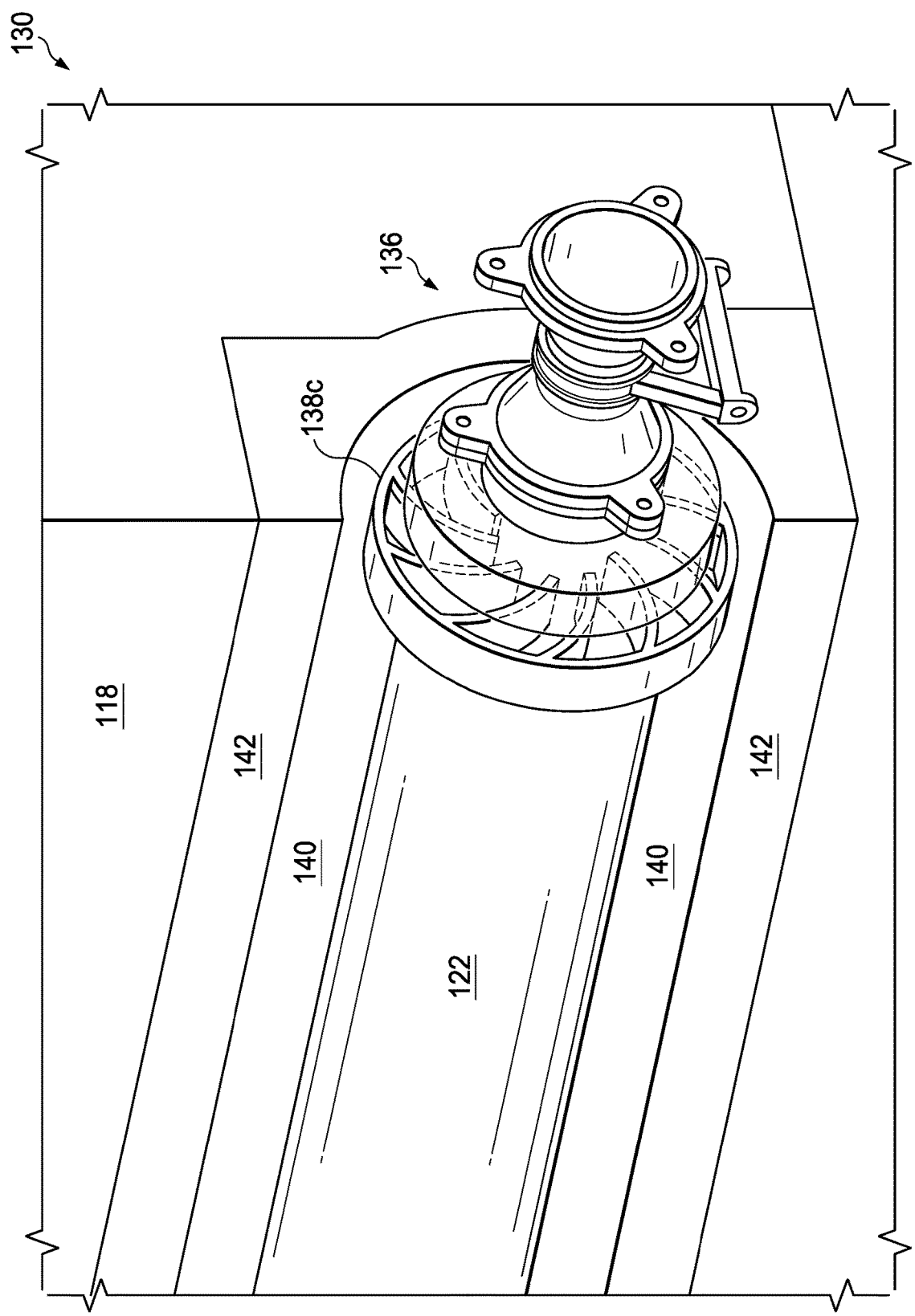
FIG. 4 shows an isometric cut-away view of a portion of a drive system that depicts an embodiment of present invention.

Referring now to FIG. 4, an isometric cut-away view of a portion of an active thermal management system 130 illustrates an embodiment of the present invention. In this illustration, distal portion 136 of tail rotor drive shaft 122 is surrounded by one or more air management baffles 140, in which a fan or impeller 138*c* is fixed to the distal portion 136 of tail rotor drive shaft 122, such that they turn together to provide air flow to cool tail rotor drive shaft 122. Insulation 142 is around the tail rotor drive shaft 122 and air management baffle 140. Similar arrangements of component elements, not shown, may be disposed at the proximate portion 132, or the intermediate portion 134, or any combination thereof, of tail rotor drive shaft 122.

In the event of an engine fire involving engine in engine compartment 118, the combination of the composite material of the tail rotor drive shaft 122, air driven by fan or impeller 138*a*, 138*b*, and/or 138*b* through the one or more air management baffles 140 over or next to, the tail rotor drive shaft 122 to carry heat away. The insulation 142 would also serve to protect the tail rotor drive shaft 122 to ensure continued safe flight at least for period of time sufficient for a safe landing.

Figure 5:
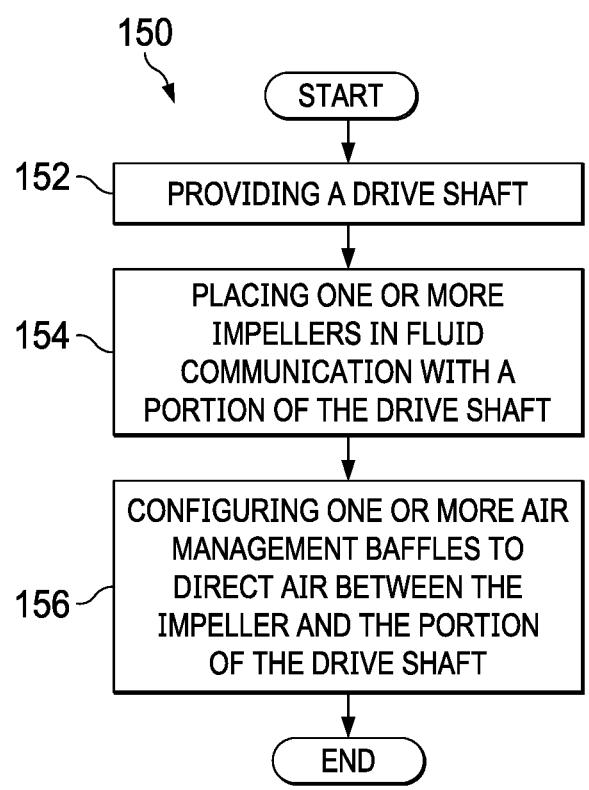
FIG. 5 shows a flowchart of a method of managing the thermal condition of a drive system that depicts an embodiment of the present invention.

Referring now to FIG. 5, a flowchart 150 of a method for managing the thermal condition of a drive system illustrates an embodiment of the present invention. The method 150 begins at block 152 by providing a drive shaft and at block 154 by placing one or more fans or impellers in fluid communication with a portion of a drive shaft such as tail rotor drive shaft. The method 150 concludes at block 156 by configuring one or more air management baffles to direct air between the one or more fans or impellers and the drive shaft. If the fans or impellers are driven separately from the tail rotor drive shaft The skilled artisan will recognize that the novel active thermal management system 130 of the present invention provides independent methods of rendering a drive system tolerant to the excessive heat that may occur in an engine compartment: use of fire-tolerant composite material for a drive shaft such as tail rotor drive shaft 122; one or more fans or impellers 138*a*, 138*b*, and/or 138*c* connected to the drive shaft to move air over the shaft through one or air management baffles 140; and insulation 142 around the drive shaft.

Non-limiting examples of composite materials for use with the drive shafts include, e.g., metals, carbon fiber, metal-carbon fiber, fiber reinforcement unidirectional layers embedded in the thermoplastic polymer, or combinations thereof. For example, the composite drive shafts may be a composite tube that is a braided fiber and resin transfer molded component. Such components are typically more damage tolerant and have a higher ballistic survivability. The braided fiber may be either a two-dimensional or a three-dimensional braided fiber. However, it should be understood that the composite shaft may also be manufactured by filament winding, fiber placement, or any other processes that are deemed appropriate. The drive shafts can also include end adapters, which can be formed from a metallic material, such as aluminum, titanium, or steel, but may be formed from any other suitable rigid material, including non-metallic material. Composite materials and manufacturing of composite drive shafts are taught in, e.g., U.S. Pat. No. 7,335,108, relevant portions incorporated herein by reference.

Insulation that is normally used to insulate aircraft engine compartments and components therein may be used in embodiments of the present invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A thermal management system for a rotorcraft, comprising:
   a tail rotor drive shaft, wherein a portion of the tail rotor drive shaft extends along side an exterior of an engine compartment of the rotorcraft;
   an insulation located adjacent to and surrounding a portion of one or more air management baffles, wherein a portion of the insulation is disposed between the one or more air management baffles and the engine compartment;
   one or more fans or impellers in fluid communication with at least the portion of the tail rotor drive shaft extending along side the exterior of the engine compartment; and
   wherein the one or more air management baffles surround at least the portion of the tail rotor drive shaft extending along side the exterior of the engine compartment, wherein the one or more air management baffles direct air flow caused by the one or more fans or impellers across the portion of the tail rotor drive shaft extending along side the exterior of the engine compartment, and remove heat from the tail rotor drive shaft that originates in the engine compartment.

2. The system of claim 1, wherein the portion of the tail rotor drive shaft in fluid communication with the one or more fans or impellers is at least one of a proximate portion, a distal portion, or an intermediate portion of the tail rotor drive shaft.

3. The system of claim 1, wherein the one or more fans or impellers are connected to the tail rotor drive shaft.

4. The system of claim 1, wherein the one or more air management baffles comprise an area between the insulation and the portion of the tail rotor drive shaft.

5. The system of claim 1, wherein at least a portion of the tail rotor drive shaft comprises a composite material.

6. A method of managing the thermal condition of a tail rotor drive system in a rotorcraft, comprising:
   positioning an insulation adjacent to and surrounding a portion of one or more air management baffles, wherein a portion of the insulation is disposed between the one or more air management baffles and an engine compartment of the rotorcraft, and the one or more air management baffles surround at least a portion of a tail rotor drive shaft extending along side an exterior of the engine compartment;
   placing one or more fans or impellers in fluid communication with at least the portion of the tail rotor drive shaft extending along side the exterior of the engine compartment; and
   removing heat from the tail rotor drive shaft that originates in the engine compartment by creating an air flow using the one or more fans or impellers and directing the air flow across the portion of the tail rotor drive shaft extending along side the exterior of the engine compartment using the one or more air management baffles.

7. The method of claim 6, further comprising placing the one or more fans or impellers in fluid communication with at least one of a proximate portion, a distal portion, or an intermediate portion of the tail rotor drive shaft.

8. The method of claim 6, further comprising connecting the one or more fans or impellers to the tail rotor drive shaft.

9. The method of claim 6, wherein the one or more air management baffles comprise an area between the insulation and the portion of the tail rotor drive shaft extending along side the exterior of the engine compartment.

10. The method of claim 6, wherein the tail rotor drive shaft, the one or more fans or impellers, or both comprise a composite material.

11. A rotorcraft, comprising:
a fuselage;
an engine compartment coupled to the fuselage;
an engine coupled to the engine compartment and disposed within the engine compartment;
a transmission coupled to the fuselage;
the engine coupled to the transmission;
a tail rotor drive shaft coupled to the transmission, wherein a portion of the tail rotor drive shaft extends along side an exterior of the engine compartment;
an insulation located adjacent to and surrounding a portion of one or more air management baffles, wherein a portion of the insulation is disposed between the one or more air management baffles and the engine compartment;
one or more fans or impellers in fluid communication with at least the portion of the tail rotor drive shaft extending along side the exterior of the engine compartment; and
wherein the one or more air management baffles surround at least the portion of the tail rotor drive shaft extending along side the exterior of the engine compartment, wherein the one or more air management baffles direct air flow caused by the one or more fans or impellers across the portion of the tail rotor drive shaft extending along side the exterior of the engine compartment, and remove heat from the tail rotor drive shaft that originates in the engine compartment.

12. The rotorcraft of claim 11, wherein the portion of the tail rotor drive shaft in fluid communication with the one or more fans or impellers is at least one of a proximate portion, a distal portion, or an intermediate portion of the tail rotor drive shaft.

13. The rotorcraft of claim 11, wherein the one or more fans or impellers are connected to the tail rotor drive shaft.

14. The rotorcraft of claim 11, wherein the one or more air management baffles comprise an area between the insulation and the portion of the tail rotor drive shaft.

15. The rotorcraft of claim 11, wherein at least a portion of the tail rotor drive shaft comprises a composite material.

* * * * *